United States Patent [19]

Brownlie et al.

[11] Patent Number: 4,688,850
[45] Date of Patent: Aug. 25, 1987

[54] INFANT SEAT

[75] Inventors: Alan Brownlie, Skaneateles, N.Y.; Nathaniel Saint, Elverson, Pa.

[73] Assignee: Graco Metal Products, Elverson, Pa.

[21] Appl. No.: 782,236

[22] Filed: Sep. 30, 1985

[51] Int. Cl.[4] .......................... A47D 13/10; B60N 1/12
[52] U.S. Cl. .................................... 297/270; 297/131; 297/183; 297/250; 297/377
[58] Field of Search ............... 297/118, 131, 132, 151, 297/183, 250, 270, 377

[56] References Cited

U.S. PATENT DOCUMENTS

| 513,246 | 1/1894 | Parliaman | 297/377 X |
|---|---|---|---|
| 1,675,985 | 7/1928 | Martin | 297/151 |
| 2,361,853 | 10/1944 | Lundquist . | |
| 2,410,088 | 10/1946 | Lundquist . | |
| 3,328,079 | 6/1967 | Byczkowski et al. | 297/373 |
| 3,334,944 | 8/1967 | Gould et al. | 297/377 |
| 3,409,325 | 11/1968 | Hamilton et al. | 297/377 |
| 3,719,387 | 3/1973 | Boschen et al. | 297/379 |
| 3,804,459 | 4/1974 | Nose | 297/377 |
| 4,324,432 | 4/1982 | Eldon III, et al. | 297/377 |
| 4,371,206 | 2/1983 | Johnson, Sr. | 297/270 X |
| 4,500,133 | 2/1985 | Nakao et al. | 297/250 |

FOREIGN PATENT DOCUMENTS 1404666 2/1969 Fed. Rep. of Germany .

Primary Examiner—Kenneth J. Dorner
Assistant Examiner—Peter R. Brown
Attorney, Agent, or Firm—Seidel, Gonda, Goldhammer & Abbott

[57] ABSTRACT

An infant seat which serves as a rocker, car safety seat, carrier and swing seat. The seat includes a plastic shell having a seat portion, a backrest portion and a pair of hook members for threadably receiving and retaining a seat belt. A foldable rocker mechanism is coupled to the shell and is latchable in one or more positions so as to rockably support the seat on a flat support surface or provide a stable support for the seat on a car seat. A handle mechanism for carrying the seat includes a handle member rotatably coupled to the shell and latchable in a forward position. A bail is attachable to the handle so as to swingably support the handle from a windup swing mechanism when the handle is in the forward position.

16 Claims, 14 Drawing Figures

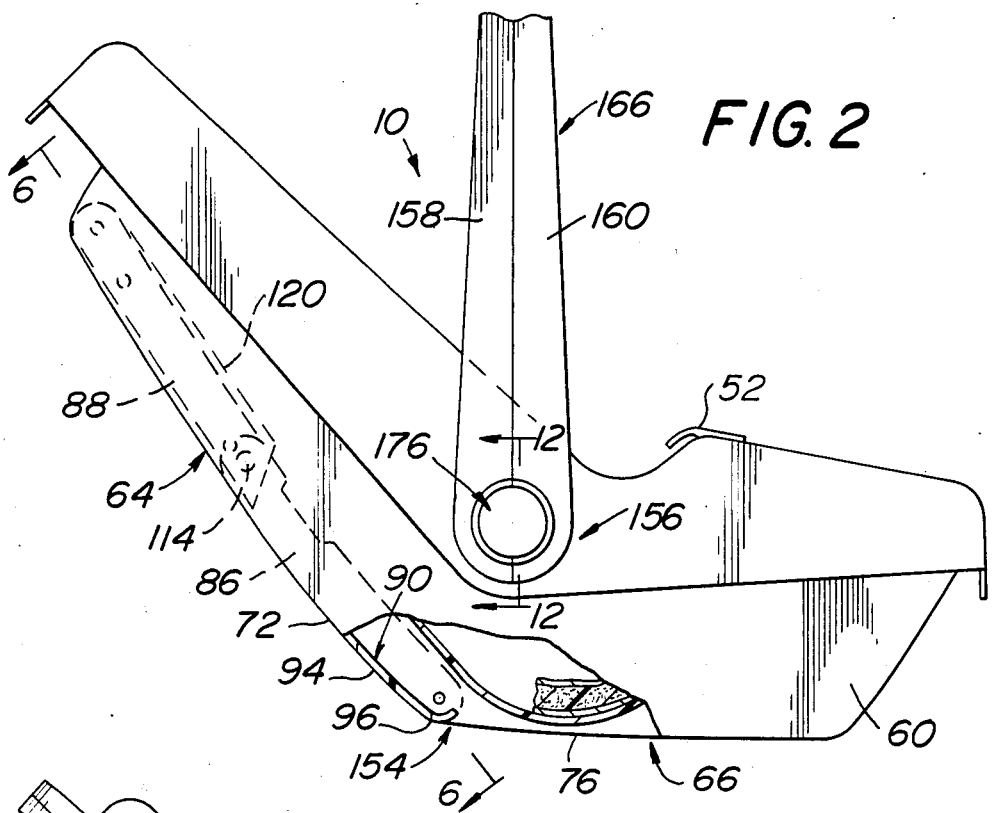
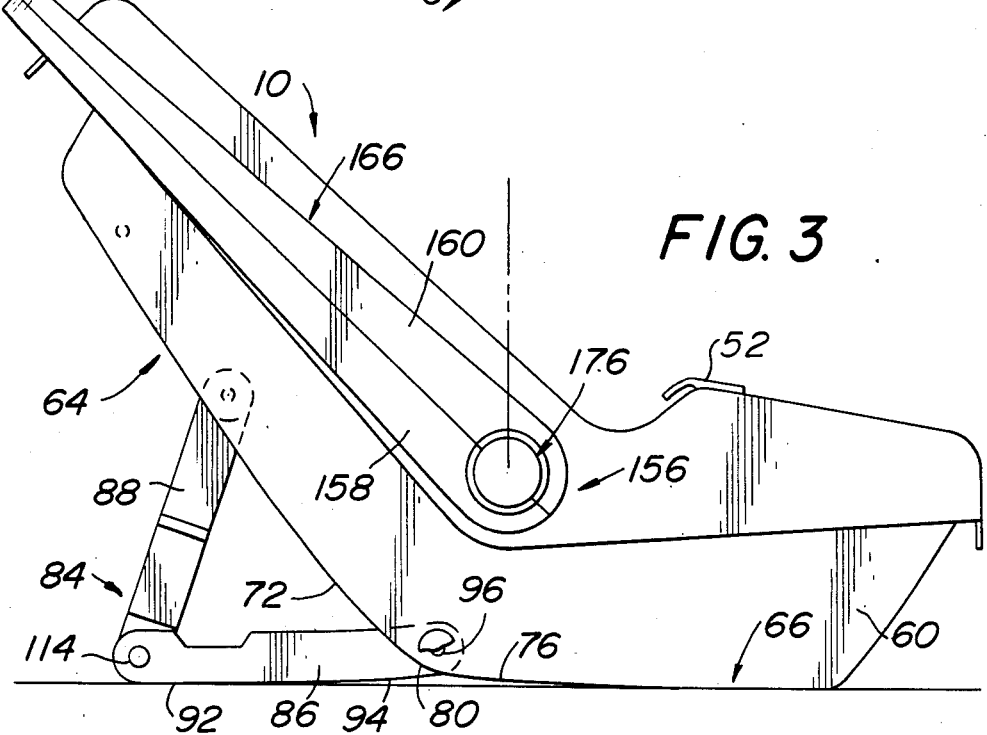

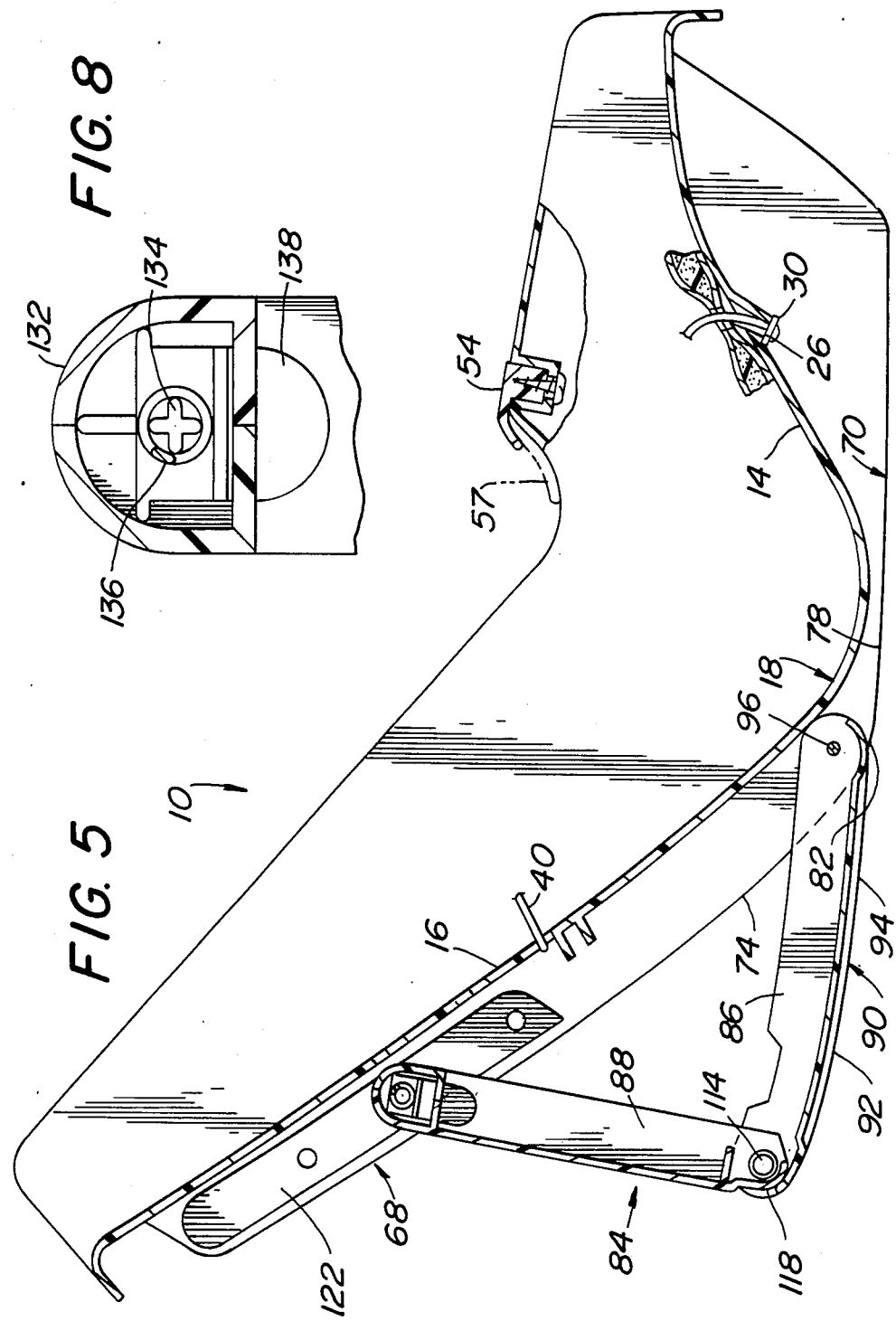

INFANT SEAT

BACKGROUND OF THE INVENTION

The present invention is directed to a lightweight infant seat which serves as a rocker, car safety seat, carrier and swing seat.

An infant swing carrier having a carrying handle which may be detachably coupled to a swing hanger is disclosed in U.S. Pat. No. 4,324,432 issued Apr. 13, 1982. The swing carrier is provided with a tilt wire support member to facilitate supporting the carrier on a surface.

The problem solved by the present invention is that of providing an infant seat which may be utilized as a rocker on a flat supporting surface, a car safety seat retainable by a seat belt on a car seat, a carrier which is readily transportable, and a swing seat attachable to a swing mechanism.

BRIEF SUMMARY OF THE INVENTION

Apparatus comprising a seat including a shell having a seat portion and a backrest portion, a foldable rocker mechanism for rockably supporting the seat on a support surface, the rocker mechanism being coupled to the shell and including first and second members, means for coupling the first and second member so as to provide an articulation joint therebetween, and means for latching the first and second members in one or more positions, and a handle mechanism for carrying the seat including a handle member, means for rotatably coupling the handle member and the shell, and means for latching the handle member in a forward position such that the handle member can be grasped to carry the seat.

For the purpose of illustrating the invention, there is shown in the drawings a form which is presently preferred; it being understood, however, that this invention is not limited to the precise arrangements and instrumentalities shown.

BRIEF DESCRIPTION OF THE DRAWINGS

FIG. 2 is a side elevation taken along 2—2 in FIG. 1 with a partial section showing the storage compartment.

FIG. 3 is a side elevation of the infant seat in use as a car safety seat.

FIG. 5 is a section taken along 5—5 in FIG. 1 showing details of the rocker mechanism.

FIG. 8 is a section taken along 8—8 in FIG. 6.

DETAILED DESCRIPTION OF THE INVENTION

Figure 1:
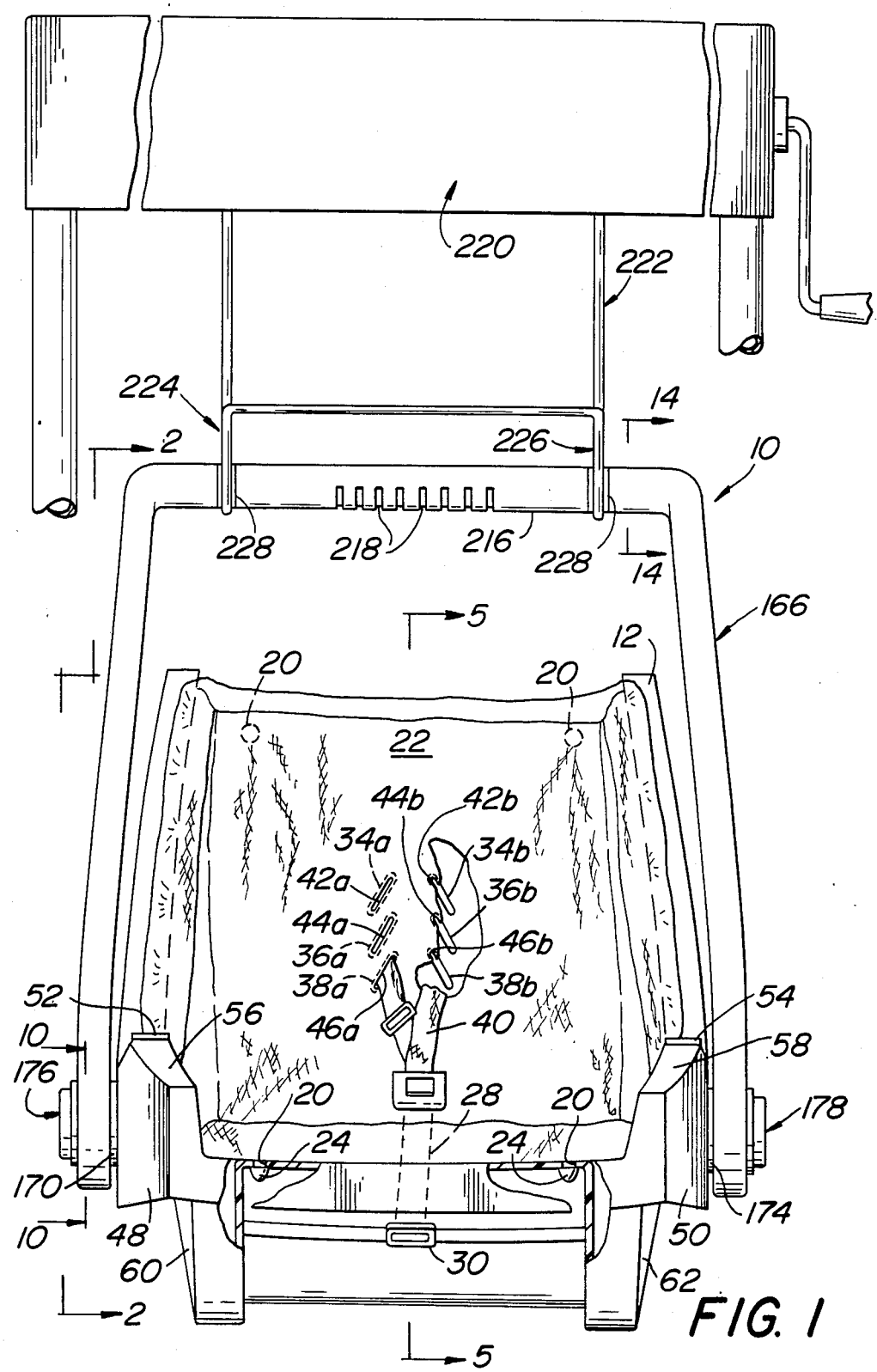
FIG. 1 is a front elevation of the infant seat of the present invention attached to a conventional swing mechanism.

Referring to the drawings, wherein like numerals indicate like elements, the infant seat of the present invention is designated generally as 10 in FIG. 1. The seat includes a hard plastic shell 12 which is a single piece construction injection molded from polystyrene or the like. The shell includes a seat portion 14 and a backrest portion 16 formed from a single contoured wall 18. The seat and backrest portions 14, 16 are provided with openings 20. A seat liner 22 is sized and shaped to fit over the surface 18. The liner includes a urethane foam pad covered by a fabric material stitched to the outside edge of the pad. Plastic fasteners 24 are secured to the underside of the liner and are positioned so as to be received by the openings 20. The openings are sized so that the liner fasteners are frictionally engaged by the shell.

The seat portion 14 is provided with a slot 26 through which a fabric harness portion 28 is threaded and secured in place by a metal clip 30. The seat liner 22 is provided with a corresponding slot 32 through which the harness portion 28 is threaded. The backrest portion 16 of the seat is provided with spaced pairs of slots 34a, b, 36a, b and 38a, b at different elevations. A second fabric harness portion 40 is threaded through slots 34a, b, 36a, b or 38a, b. Liner 22 is provided with corresponding slots 42a, b, 44a, b and 46a, b. Harness portion 40 is threaded through one of the pairs of slots 42a, b, 44a, b or 46a, b. Harness portions 28, 40 are secured together in conventional manner by a clip fastener.

The shell is provided with side aprons 48, 50. A pair of separate hook shaped belt retaining members 52, 54 are screw fastened to the apron surfaces 56, 58. The belt retaining members 52, 54 are made of a high strength material such a CELCON (trademark). Each retaining member 52, 54 is provided with a curved portion which extends towards the backrest portion 16 of the seat. The curved portions of the retaining members are spaced from their respective apron surfaces 56, 58 so as to define a zone through which the car seat belt 57 may be threaded. See FIG. 5. When used as a car safety seat, the seat 10 is positioned so as to face rearwardly, and seat belt 57 is threaded through the spaces between retaining members 52, 54 and their respective apron surfaces 56, 58. The seat belt is tightened against the retaining members so as to secure the seat 10 in position on the car seat.

A pair of walls 60, 62 are formed in the rear of shell 12. Wall 60 is provided with an upper surface 64 and a lower surface 66. Wall 62 is provided with an upper surface 68 and a lower surface 70. See FIG. 5. The upper and lower surfaces of each wall are gently curved at the region at which the two surfaces meet. The curved portions of the upper surfaces 64, 68 are designated 72, 74, and the curved portions of lower surfaces 66, 70 are designated 76, 78. Thus, the upper and lower surfaces of each wall meet at generally smooth curved sections, 80, 82. When the seat is placed on a hard flat supporting surface, the lower wall surfaces 66, 70, in combination with a rocker mechanism 84 described hereafter, function as rocker legs in a manner similar to the legs of a conventional rocker chair.

Figure 4:
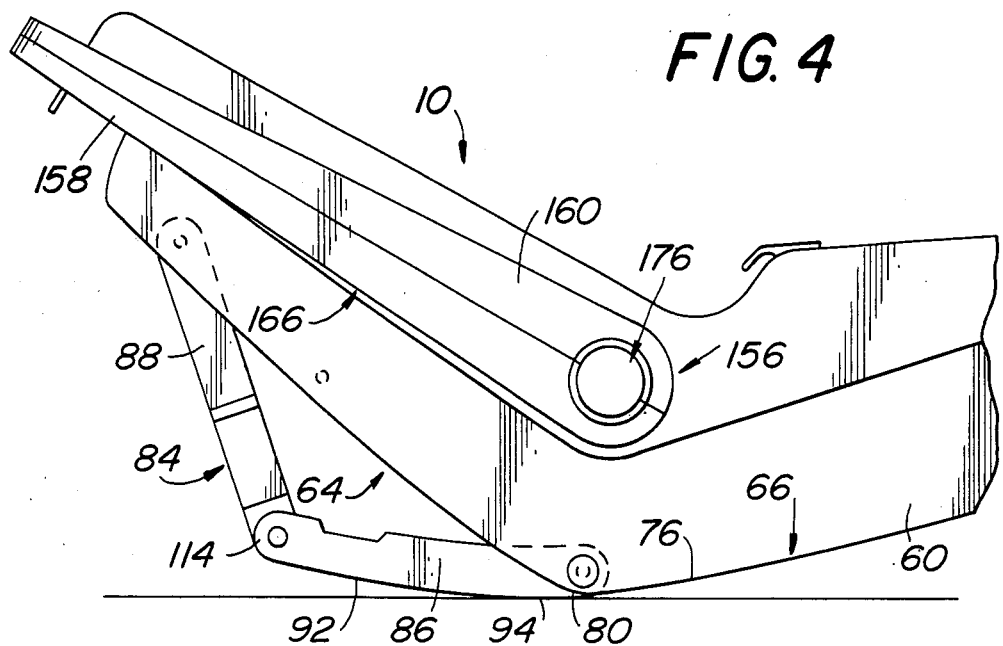
FIG. 4 is a side elevation of the infant seat in use as a rocker.
Figure 9:
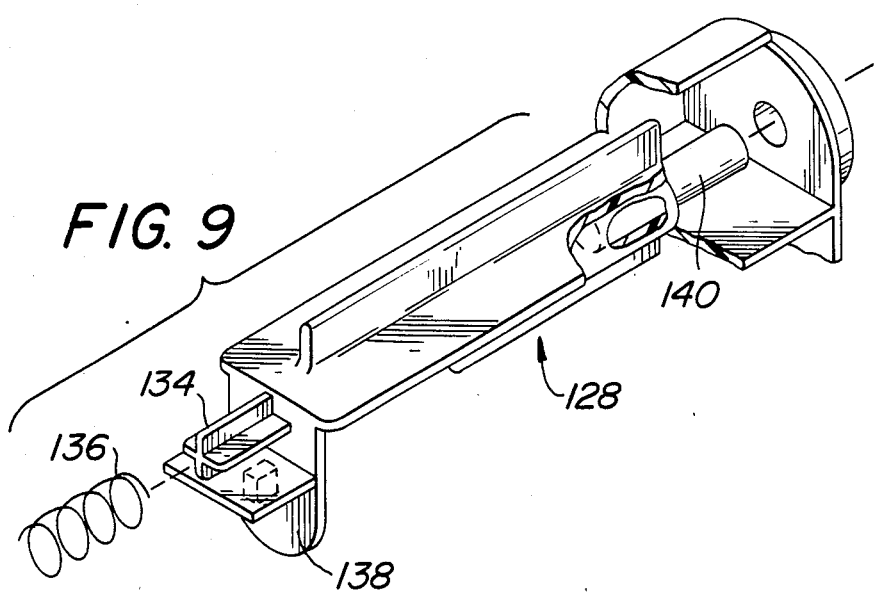
FIG. 9 is an enlarged isometric of the rocker spring latch mechanism components.

The rocker mechanism 84 includes first and second members 86, 88. Member 86 is provided with a wall 90 having a generally flat upper surface 92 and a gently curved lower surface 94. The curvature of surface 94 is approximately the same as the curvature of the curved portions 76, 78 of wall surfaces 66, 70. Thus, in one position of the rocker mechanism 84, shown in FIG. 4, the curved wall surface portions 76, 78 and curved wall surface portion 94 contact a flat supporting surface and function as rocker legs so that the seat may be rocked to and fro. The pitch of the rocker motion of the seat is determined by the curvature of the wall surface portions 76, 78 and the curvature of wall surface portion 94.

The member 86 is pivotably mounted on a metal rod 96 extending through apertures in the member side walls 98, 100 and corresponding apertures in the walls 60, 62. See FIG. 6. The rod is prevented from shifting along the rod axis by a plastic bolt 102 secured in wall 62.

Member 88 has a generally rectangular frame shape. The member includes side walls 106, 108 which are stepped at 110, 112 so as to fit inside side walls 98, 100 of member 86. Walls 106, 98 are pivotably coupled by a metal rivet 114. Walls 108, 100 are pivotably coupled by a metal rivet 116. In this manner, an articulation joint is formed between members 86, 88 so that the rocker mechanism 84 may be adjustably positioned depending on the intended use of the seat. The member 88 is provided with a curved wall portion 118 extending between walls 106, 108 at the region of the articulation joint. See FIG. 5. The curved wall portion defines a partial cylinder wall and provides a bearing surface for the underside of wall 90 at the region of the articulation joint.

Wall 60 is provided with a track 120. See FIG. 2 and 6. Wall 62 is provided with a track 122. See FIGS. 5 and 6. A trunnion 124 is formed in side wall 106. A trunnion 126 is formed in side wall 108. Trunnion 124 rides in track 120. Trunnion 126 rides in track 122.

Figure 6:
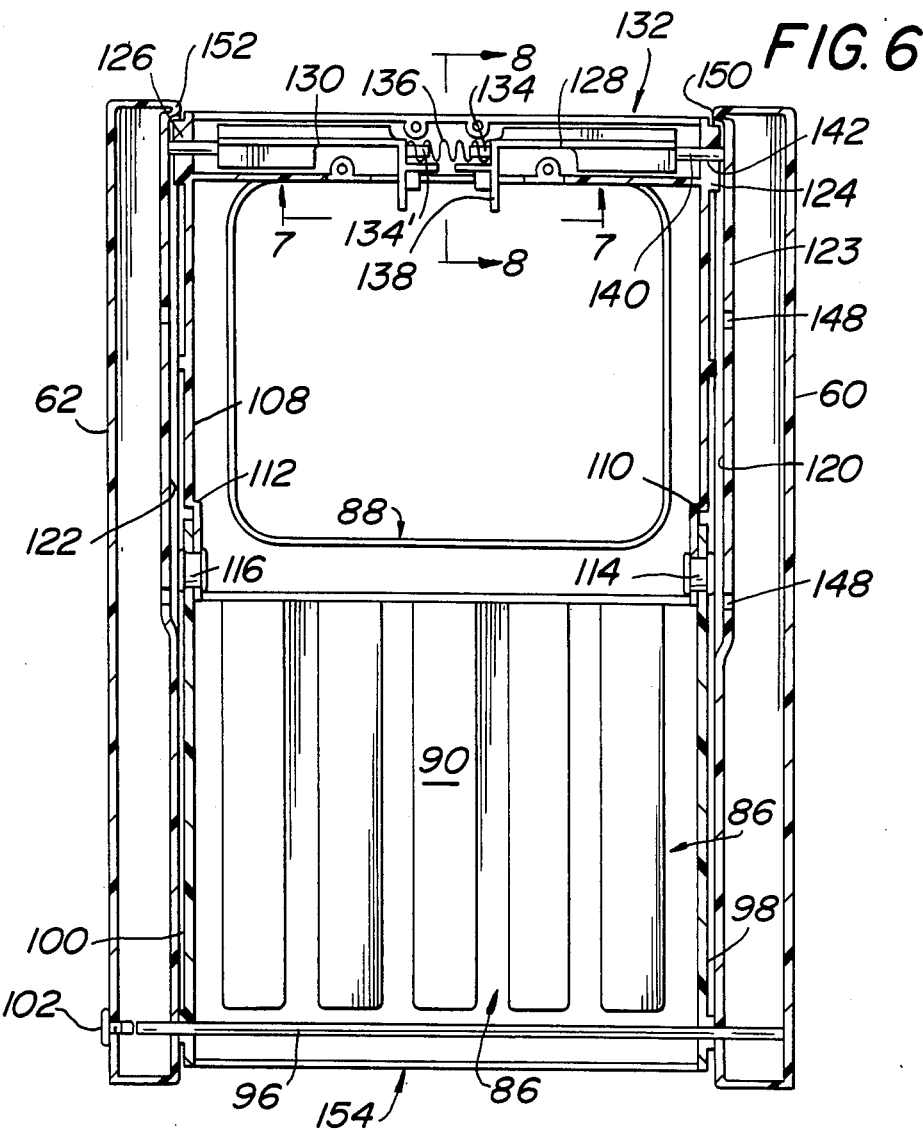
FIG. 6 is a section taken along 6—6 in FIG. 2 showing the rocker spring latch mechanism.
Figure 7:
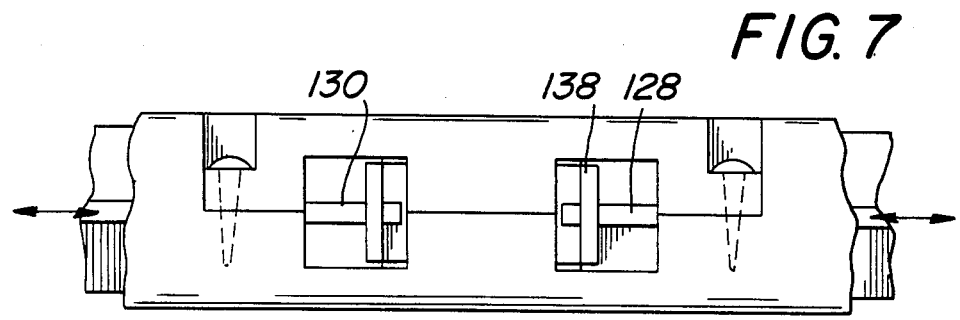
FIG. 7 is a view of the rocker spring latch mechanism taken along 7—7 in FIG. 6.
Figure 10:
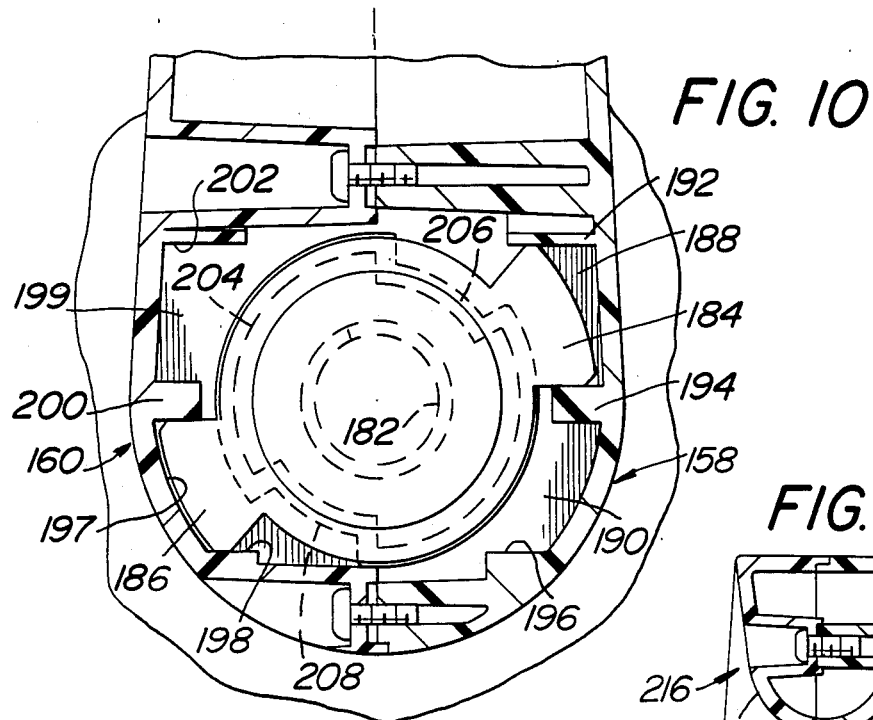
FIG. 10 is a section of the handle release mechanism taken along 10—10 in FIG. 1.
Figure 14:
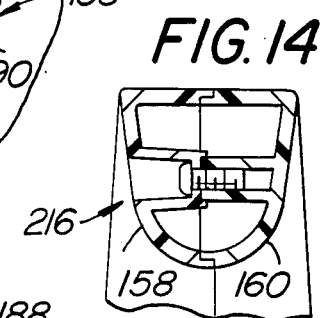
FIG. 14 is a section of the transverse portion of the handle member taken along 14—14 in FIG. 1.
Figure 11:
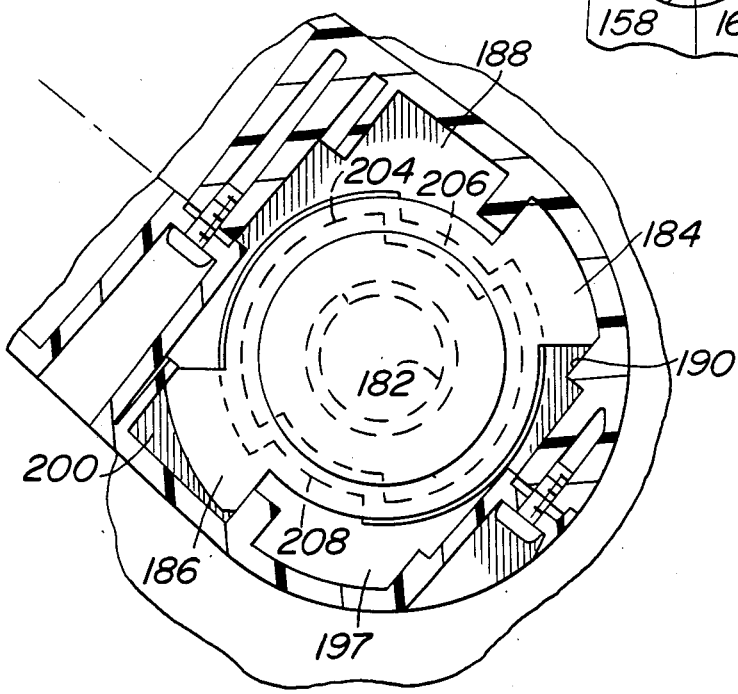
FIG. 11 shows the handle release mechanism in another position.

A pair of latches 128, 130 are slideably mounted at the interior of end 132 of member 88 as shown in FIGS. 6 and 7. The latches are identical. Accordingly, description of latch 128 will suffice. Each latch is provided with a lug 134 (134'), the lugs of both latches facing each other and being coupled by a return spring 136 so as to bias each latch outwardly towards side wall 106 or 108. Latch 128 includes an upstanding ear 138 proximal one end and a metal nose 140 secured to the other end. In the rest position of the latch, the metal nose extends through aligned openings 142 (in trunnion 124) and 146 or 148 (in the track wall 123), latching the rocker mechanism 84 in either of two positions.

When nose 140 is engaged in opening 146, the rocker mechanism 84 is latched in position such that the flat surface 92 of wall 90 is substantially coplanar with the surfaces 66, 70 of walls 60, 62 so as to support the seat in a stable position on a supporting surface such as a floor or the seat of a car. See FIG. 3. When the nose is engaged at opening 148, the rocker mechanism 84 is latched in position such that the curved surface 94 of wall 90, in combination with the curved surfaces 72, 74 of walls 60, 62, provides a gently curved surface for rockably supporting the seat on a flat supporting surface. See FIG. 4. To adjust the position of the rocker mechanism, it is only necessary to grasp the latch ears and squeeze the latches towards each other against the return force of spring 136 so as to retract the metal noses from the track wall openings thereby freeing the latches. The rocker mechanism may then be articulated to the desired position, trunnions 124, 126 riding inside tracks 120, 122 until the noses enter the desired track wall openings thereby latching the rocker mechanism in position.

If the rocker mechanism is not to be used at all, the latches may be freed, by squeezing the latch ears as described above, and the member 88 moved so that the trunnions 124, 126 ride in tracks 120, 122 towards the track ends 150, 152. As the trunnions move towards the track ends, the rocker mechanism collapses such that the exterior surfaces of members 86, 88 are substantially flush with the adjacent wall surfaces 64, 68. See FIG. 2. In the collapsed position of rocker mechanism 84, wall 90 of member 86 is spaced from the backside of the shell 12 so as to form a compartment wherein articles, such as a seat pad or the like can be stored. The metal rod 96 is preferably positioned with sufficient clearance from the backside of the shell so as not to interfere with the compartment entrance at end 154 of member 86.

Figure 12:
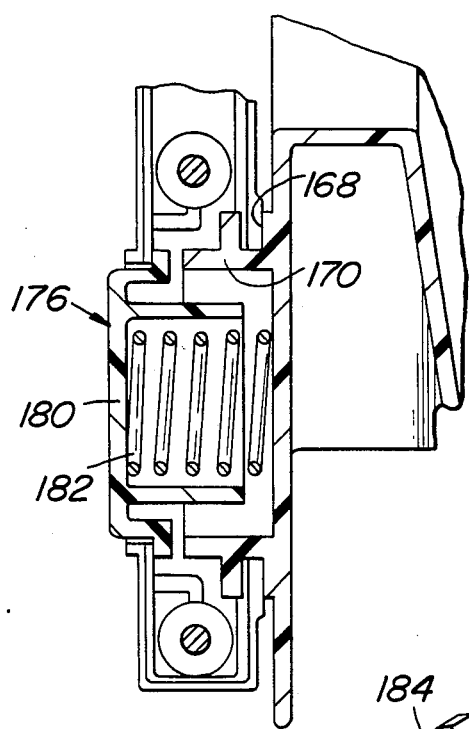
FIG. 12 is a section of the handle release mechanism taken along 12—12 in FIG. 2.
Figure 13:
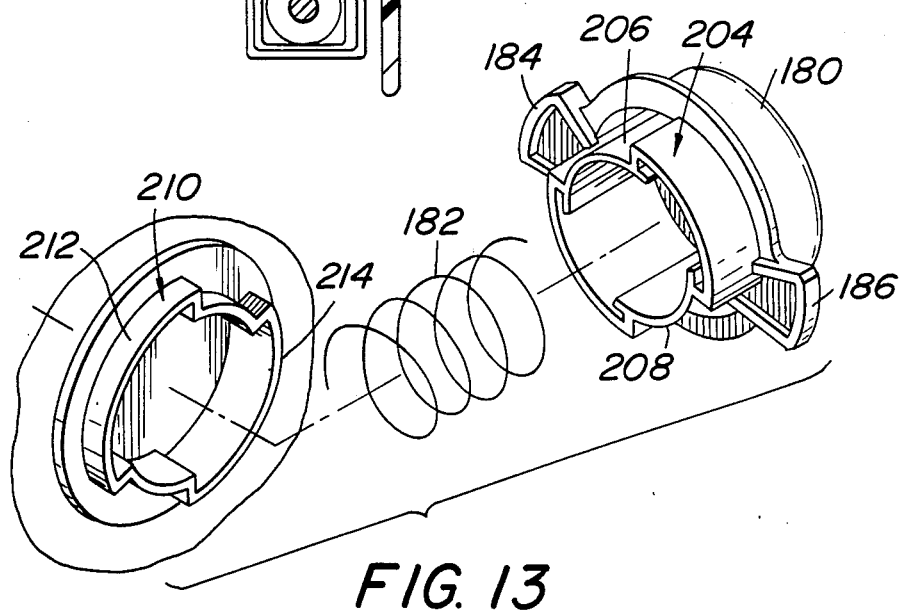
FIG. 13 is an exploded view of the parts of the handle release mechanism.

The seat 10 is provided with a handle mechansim 156 comprising two generally U-shaped injection molded pieces 158, 160 which are screw-coupled together, piece 158 being provided with peripheral shoulders (not shown) on which piece 158 nests. When assembled, the handle pieces 158, 160 define a handle member 166. The handle member is rotatably mounted at one end in a groove 168 formed on shell boss 170. See FIGS. 1 and 12. The handle member is rotatably mounted at the other end on a like groove (not shown) formed in shell boss 174.

The handle mechanism 156 includes a pair of spring latch mechanisms 176, 178 for latching the handle member 166 in either of two positions. Spring latch mechanisms 176, 178 are identical. Accordingly, description of spring latch mechanism 176 will suffice. Spring latch mechanism 176 includes a button 180 spaced from shell boss 170 by a return spring 182. See FIG. 12. The button is provided with a pair of ears 184, 186. Ear 184 is adapted to nest in spaces 188, 190 between lug stops 192, 194 and 194, 196, the lug stops being formed on the interior wall of handle piece 158. Ear 186 is adapted to nest in the spaces 197, 199 between lug stops 198, 200 and 200, 202, the lug stops being formed on the interior wall of handle piece 160. The button 180 is provided with a circular wall 204 having diametrically opposed peripheral recesses 206, 208. Each shell boss is provided with a wall 210 having diametrically opposed locating lugs 212, 214. When button 180 is depressed against the return force of spring 182, the locating lugs 212, 214 enter the peripheral recesses 206, 208 on the button wall thereby preventing rotary motion of the button. Ears 184, 186 clear the lug stops 194, 200. The handle member 166 may therefore be rotated on the shell boss, lug stops 194, 200 wiping against the back surfaces of the ears 184, 186 during rotation of the handle member. When the handle member is rotated such that the lug stops 194, 200 clear the button ears 184, 186, spring 182 pushes the button outwardly so that ears 184, 186 nest in the spaces between lug stop 194, 192 (or 196) and 200, 198 (or 202). The force exerted by spring 182 on button 180 is such that ears 184, 186 prevent further rotary movement of the handle member when the ears are contacted by the handle member lug stops.

When the handle member is latched in the position shown in FIG. 3, the handle member is not being used. When the handle member is latched in the forward position shown in FIG. 2, the handle member may be grasped along the transverse portion 216 (FIG. 1) and the seat may be carried in a stable configuration, without danger of movement of the handle member with respect to the shell. The transverse portion 216 of the handle member may be provided with grooves 218 to facilitate gripping therealong. In addition, when the handle member is in the forward position shown in FIGS. 2 and 3, the seat 10 may be suspended from a conventional wind up swing mechanism 220 by means of a metal bail 222. The bail is provided with spaced bight portions 224, 226 which frictionally engage the transverse portion 216 of handle member 166 at recessed flats 228 formed on handle pieces 158, 160. The free ends of the bail (not shown) are inserted in a pair of apertures formed in the swing mechanism casing whereby the bail provides a stable support for the handle member. Rocking motion of the swing mechanism will thereby rock or swing the seat 10 to and fro.

All parts of the infant seat of the present invention are made of a rigid, lightweight plastic material such as polystyrene except as otherwise noted above. The shell 12 is a unitary injection molded structure. The handle member 166 is a two piece injection molded structure. The belt retaining members 52, 54 are made of a higher strength plastic material such as CELCON (trademark). The infant seat 10 is made of a minimum of parts which can be readily assembled. The seat is lightweight and easily transportable. The rocker mechanism 84 provides the support required to utilize the seat as a rocker or as a car safety seat. The handle mechanism 156 can be grasped to lift the seat when it is to be used as a carrier, or the handle mechanism can be suspended from a conventional swing mechanism by bail 222.

The present invention may be embodied in other specific forms without departing from the spirit or essential attributes thereof and, accordingly, reference should be made to the appended claims, rather than to the foregoing specification, as indicating the scope of the invention.

I claim:

1. Apparatus, comprising:
   a seat including a shell having a seat portion and a backrest portion, said seat portion having a curved surface portion,
   a foldable rocker mechanism for rockably supporting said seat on a support surface, said rocker mechanism including first and second members, said first member having a curved surface portion and being pivotably coupled at one end to the shell at a location proximate the junction of said shell seat and backrest portions and at another end to one end of the second member, said second member being slidably coupled at its other end to said shell backrest portion, and means for latching the first and second members in at least one position such that said first member curved surface portion and said shell seat curved surface portion together define a substantially continuous curved surface for rockably supporting said seat on the support surface,
   a handle mechanism for carrying said seat including a handle rotatably mounted on said shell, and means for latching said handle member in a forward position such that said handle member can be grasped to carry said seat.

2. Apparatus according to claim 1 wherein said shell is provided with track means for slidably receiving said means for latching said first and second members, said means for latching said first and second members including a spring urged latch member adapted for sliding engagement within said track means.

3. Apparatus according to claim 2 wherein said latch member includes a nose, and said track means includes one or more recesses adapted to receive said nose.

4. Apparatus according to claim 1 wherein said means for latching said handle member comprises a button at least partially disposed within the handle member, means for urging said button away from said shell to a first position such that said button contacts said handle member and blocks movement of said handle member on said shell, said button being yieldingly displaceable towards said shell to a second position such that said button clears said handle member so as to allow movement of said handle member on said shell.

5. Apparatus according to claim 1 wherein said seat includes discrete means secured to said shell for threadably receiving and retaining a belt.

6. Apparatus according to claim 5 wherein said shell and said means for retaining said belt are made of different materials having different strengths.

7. Apparatus according to claim 1 wherein said rocker mechanism is foldable to a collapsed position such that said first and second members are substantially co-planar.

8. Apparatus according to claim 1 wherein said handle member comprises generally U-shaped mating sections.

9. Apparatus, comprising:
   a swing mechanism,
   a seat including a shell having a seat portion and a backrest portion, said seat portion having a curved surface portion,
   a foldable rocker mechanism for rockably supporting said seat on a support surface, said rocker mechanism including first and second members, said first member having a curved surface portion and being pivotably coupled at one end to the shell at a location proximate the junction of said shell seat and backrest portions and at another end to one end of the second member, said second member being slidably coupled at its other end to said shell backrest portion, and means for latching the first and second members in at least one position such that said first member curved surface portion and said shell seat curved surface portion together define a substantially continuous curved surface for rockably supporting said seat on the support surface,
   a handle mechanism for carrying said seat including a handle member rotatably mounted on said shell, and means for latching said handle member in a forward position such that said handle member can be grasped to carry said seat, and
   means attachable to said handle member and said swing mechanism for swingably supporting said handle member and shell.

10. Apparatus according to claim 9 wherein said shell is provided with track means for slidably receiving said means for latching the first and second members, said means for latching said first and second members including a spring urged latch member adapted for sliding engagement within said track means.

11. Appartus according to claim 10 wherein said latch member includes a nose, said track means including one or more recesses adapted to receive said nose.

12. Apparatus according to claim 9 wherein said means for latching said handle member comprises a button at least partially disposed within the handle member, means for urging said button away from said shell to a first position such that said button contacts said handle member and blocks movement of said handle member on said shell, said button being yieldingly displaceable towards said shell to a second position such that said button clears said handle member so as to allow movement of said handle member on said shell.

13. Apparatus according to claim 9 wherein said means for swingably supporting said handle member includes a bail having a pair of spaced interconnected bights for frictional engagement with said handle member.

14. Apparatus according to claim 9 wherein said seat includes discrete means secured to said shell for threadably receiving and retaining a belt.

15. Apparatus according to claim 14 wherein said shell and said means for retaining said belt are made of different materials having different strengths.

16. Apparatus according to claim 9 wherein said rocker mechanism is foldable to a collapsed position wherein said first and second members are substantially coplanar.

* * * * *